United States Patent [19]

Takahashi et al.

[11] Patent Number: 5,377,111
[45] Date of Patent: Dec. 27, 1994

[54] ELECTRONIC CONTROL APPARATUS FOR AUTOMATIC POWER TRANSMISSION OF AUTOMOTIVE VEHICLE

[75] Inventors: Seiichi Takahashi; Yoshiaki Ueda, both of Fuji, Japan

[73] Assignee: Jatco Corporation, Fuji, Japan

[21] Appl. No.: 9,989

[22] Filed: Jan. 27, 1993

[30] Foreign Application Priority Data

| Jan. 28, 1992 | [JP] | Japan | 4-37127 |
| Jan. 31, 1992 | [JP] | Japan | 4-46129 |
| Mar. 6, 1992 | [JP] | Japan | 4-84763 |
| Mar. 6, 1992 | [JP] | Japan | 4-84764 |

[51] Int. Cl.$^5$ ............... G06F 15/50; B60K 41/02
[52] U.S. Cl. ............... 364/424.1; 364/431.12; 477/161
[58] Field of Search ......... 364/424.1, 431.12, 431.04; 74/866, 867; 395/425; 192/0.092, 3.51, 3.54

[56] References Cited

U.S. PATENT DOCUMENTS

| 4,595,986 | 6/1986 | Daubenspeck et al. | 364/424.1 |
| 4,781,080 | 11/1988 | Iwatsuki | 74/867 |
| 4,912,639 | 3/1990 | Kawamoto et al. | 364/424.1 |
| 5,122,956 | 6/1992 | Satoh et al. | 364/424.1 |
| 5,131,294 | 7/1992 | Yoshimura | 74/866 |
| 5,188,005 | 2/1993 | Sankpal et al. | 74/866 |
| 5,201,251 | 4/1993 | Kitagawa et al. | 364/424.1 |
| 5,235,696 | 8/1993 | Schaff | 395/425 |
| 5,247,446 | 9/1993 | Motz et al. | 364/431.12 |

FOREIGN PATENT DOCUMENTS

| 1-312252 | 12/1989 | Japan . |
| 2-3740 | 1/1990 | Japan . |
| 4-191135 | 7/1992 | Japan . |
| 4191135 | 7/1992 | Japan . |
| 4-238747 | 8/1992 | Japan . |
| 2-3744 | 1/9190 | Japan . |

Primary Examiner—Thomas G. Black
Assistant Examiner—Tan Q. Nguyen
Attorney, Agent, or Firm—Foley & Lardner

[57] ABSTRACT

In an electronically controlled automatic power transmission of an automotive vehicle in which an electronic control unit is installed at a predetermined position of the vehicle remote from a main frame of the automatic power transmission, a characteristic storage unit is installed on the main frame of the automatic power transmission, the characteristic storage unit has a memory which stores inherent characteristics of controllable devices and components such as frictional engagement elements, solenoids, and sensors installed in the main frame of the automatic power transmission and is electrically connected to the electronic control unit.

13 Claims, 8 Drawing Sheets

ELECTRONIC CONTROL APPARATUS FOR AUTOMATIC POWER TRANSMISSION OF AUTOMOTIVE VEHICLE

BACKGROUND OF THE INVENTION

1. Field of the invention

The present invention relates to an electronic control apparatus for an automotive automatic power transmission.

2. Description of the Background Art

In the case of an electronically controlled automatic power transmission of an automotive vehicle, an electronic control unit is installed in the vehicle apart from a main frame of tile automatic power transmission.

Although the electronic control unit (or device) can be installed inside of the main frame of the automatic power transmission (hereinafter simply referred to as A/T) for example, as disclosed in Japanese Patent Application First Publications Heisei 1-312252 (published on Dec. 18, 1989) Heisei 2-3740 (publised on Jan. 9, 1990), and Heisei 2-3744 (published on Jan. 9, 1990), it is generally installed in a vehicle compartment of the vehicle with its thermal resistance characteristic, vibration-proof characteristic, and dust-proof characteristic taken into consideration.

Then, usually, the main frame of the A/T and electronic control device are manufactured at different places and are integrated during an assembly of the A/T in the vehicle.

Hence, the randomly selected main frame and randomly selected electronic control device are mutually integrated with each other. Accordingly, if gear ratio shift lines are slightly deviated due to some variation (or deviation) in an output characteristic (variation in output value of hydraulic (oil pressure) with respect to a duty ratio) of a solenoid used for a control of the speed gear shift, it may not be possible to correct the variations described above by means of the electronic control device.

SUMMARY OF THE INVENTION

It is, therefore, an object of the present invention to provide an electronic control apparatus for an automotive automatic power transmission which can eliminate many characteristic variations of a whole automatic power transmission such as a performance of speed gear ratio and can easily correct the variations in performance caused by individual characteristic variations of controllable devices and components such as those used for the speed gear ratio of the automatic power transmission.

The above-described object can be achieved by providing an apparatus for electronically controlling an automatic power transmission of an automotive vehicle, comprising: a) an electronic control unit for the automatic power transmission mounted in a predetermined position of the vehicle which is remote from a main frame of the automatic power transmission; and b) a characteristic storage unit installed on the main frame of the automatic power transmission, said characteristic storage unit being constructed so as to have storing means for storing inherent characteristics of controllable devices and components installed in the main frame of the automatic power transmission and being constructed so as to be electrically connected to said control unit via at least one signal line.

DETAILED DESCRIPTION OF THE PREFERRED EMBODIMENTS

Reference will, hereinafter, be made to the drawings in order to facilitate a better understanding of the present invention.

(First Preferred Embodiment)

Figure 1:
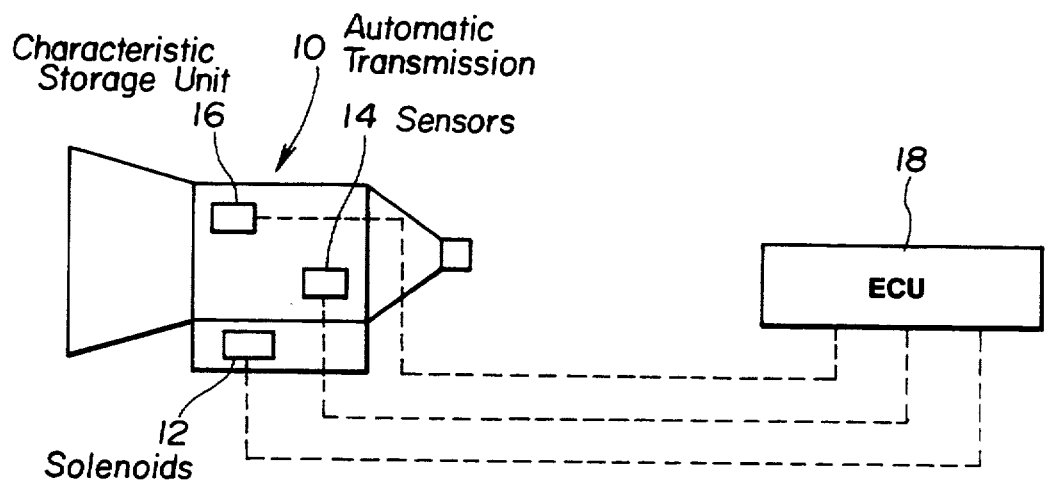
FIG. 1 is a circuit block diagram of an electronic control apparatus for an automotive power transmission in a first preferred embodiment.

FIG. 1 shows a first preferred embodiment of an electronic control apparatus for an automotive power transmission.

As shown in FIG. 1, a main frame of the A/T 10 includes a plurality of solenoids 12 used for a transmission speed gear ratio control and for a control over a hydraulic (oil pressure), a plurality of sensors 14 such as vehicle speed sensor, engine throttle opening angle sensor, oil temperature sensor, and so on, and a characteristic storage unit 16. An electronic control unit (ECU) 18 is installed in a place remote from the main frame of the A/T 10, connected to the solenoids 12 and to the sensors 14, and is connected to a characteristic storage unit 16.

The characteristic storage unit 16 is provided with IC memory, variable resistor, and a mechanical switch. Such storage means as described above stores inherent characteristics of the solenoids 12 and the sensors, rising characteristics of oil pressures on frictional engagement elements, and so on.

Figure 2:
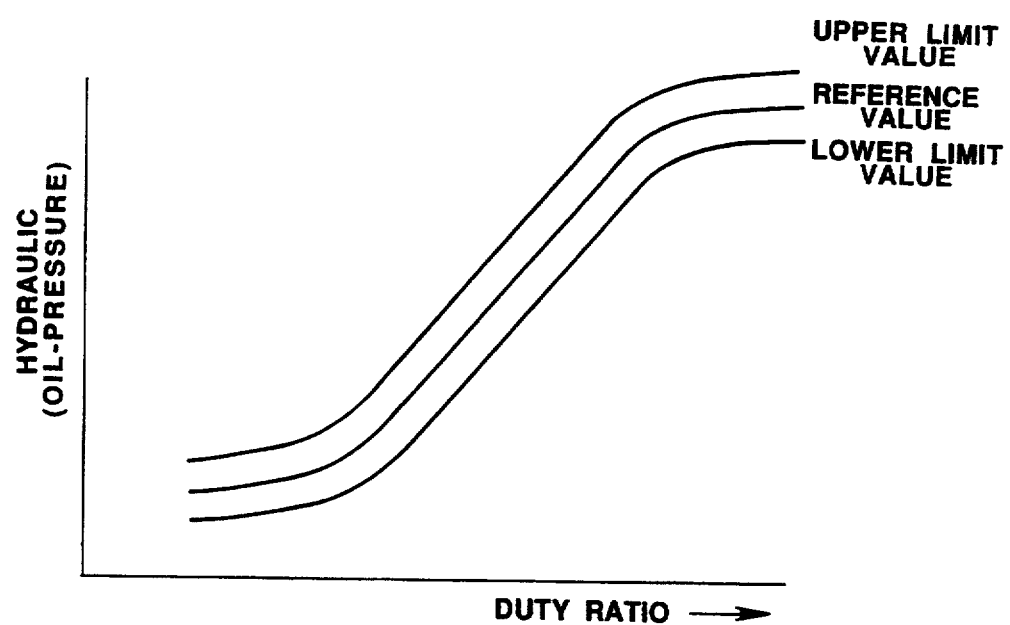
FIG. 2 is a characteristic graph of an output of hydraulic on a solenoid member of the automotive automatic power transmission shown in FIG. 1.

For example, in the case of one of the solenoids 12 used for the oil pressure control, an output oil pressure (output hydraulic) with respect to an input pulse duty ratio has upper and lower variations of a predetermined width from a reference value, as shown in FIG. 2. When the output oil pressure approaches approximately to an upper limit value the mechanical switch in the characteristic storage unit 16 needs to be set to a position of "Large". When the output oil pressure approaches approximately to a lower limit value, the mechanical switch therein needs to be set to a position of "Small". When the output oil pressure approaches approximately to the reference value, the mechanical switch therein needs to be set to a position of "Medium" and a special correction is not made by means of the electronic control unit (ECU) 18.

The electronic control unit 18 reads the signal output from the characteristic storage unit 16 when a speed gear ratio control is started.

When the mechanical switch is positioned at "Large", the duty ratio output to the solenoid is corrected so as to be decreased by a predetermined ratio. If the mechanical switch is positioned at "Small", the duty ratio output to the solenoid is corrected to be increased by the predetermined ratio.

Thus, even if variations (or deviations) occur in the characteristics of the solenoids 12, the actual control is the same as that which falls in a region of the reference value (equal to or near to the reference value). The same corrections are carried out for the other solenoids and sensors. Hence, variations in the performance of the speed gear range of the A/T can become reduced (Second Preferred Embodiment)

Figure 3:
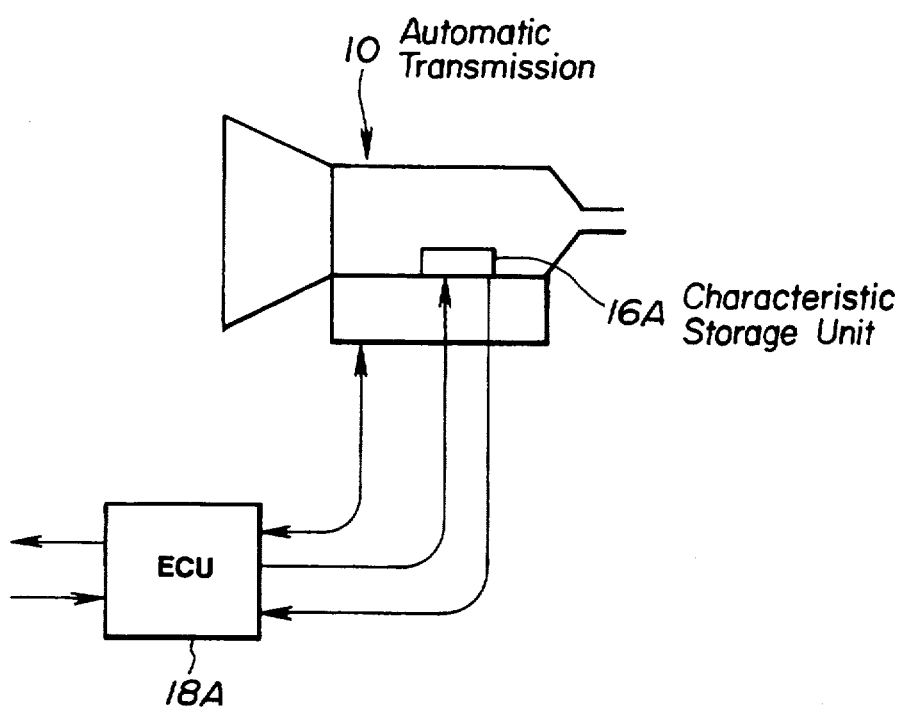
FIG. 3 is a circuit block diagram of an electronic control apparatus for an automotive automatic power transmission in a second preferred embodiment.

FIG. 3 shows a second preferred embodiment of an electronic control apparatus for an automotive automatic power transmission.

As shown in FIG. 3, the characteristic storage unit 16A is installed onto the main frame of the A/T 10 and the ECU 18A is remotely located from the main frame of the A/T 10. Both of the characteristic storage unit 16A and electronic control unit (ECU) 18A are electrically connected with each other via signal lines. The characteristic storage unit 16A writes the characteristic information inherent to the A/T 10 in response to the write signal output from the electronic control unit 18A. As the characteristic information is modified, the information is rewritten. The electronic control unit 18A reads the characteristic information in response to the read signal output from the characteristic storage unit 16A and uses it to control the A/T 10. The characteristic information includes variations in a line pressure measured by the final test, learning value learned during the run of the electronic control apparatus 18A, change in friction coefficients of the frictional elements, driving history of the vehicle, running distance, use time, and number of times the gear range shift is carried out.

In addition, the electronic control unit 18A receives input signals from a plurality of solenoids used for the oil pressure and used for gear shift control, a vehicle speed sensor, a throttle opening angle sensor, and a plurality of sensors such as an oil temperature sensor as in the case of another preferred embodiment.

Figure 4:
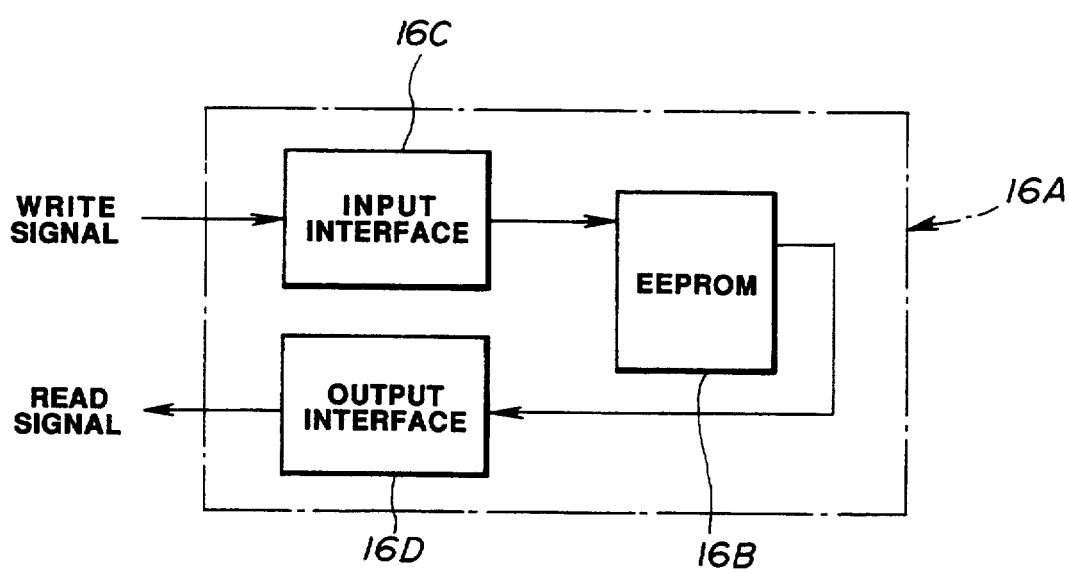
FIG. 4 is a circuit block diagram of an internal circuit of a characteristic storage unit in the second preferred embodiment shown in FIG. 3.

FIG. 4 shows a block diagram internal to the characteristic storage unit 16A.

For the characteristic storage unit 16A, an EEPROM (Electrically Erasable Programmable Read Only Memory 16B) which is a semiconductor memory capable of electrically writing and reading is used as tile storage means (memory). The write signal input to the EEPROM 16B is, at first, input to the input interface and, thereafter, input to the EEPROM 16B In a case where the ECU 18A has failed and has been replaced with a new one, the control content can be corrected by reading the information from the characteristic storage unit 16A. No change in behaviors in the transmission (A/T) 10 occurs before and after the replacement of the ECU 18A. The characteristic storage unit 16A is constructed so that the number of writes it will execute is limited. The reason is that if the number of writes to the characteristic storage unit 16A is only one, the memory content is not destroyed when the CPU of the electronic control unit overruns. Since the number of writes is limited to the EEPROM 16B, the number of writes does not exceed the limited number of writes.

(Third Preferred Embodiment)

Figure 5:
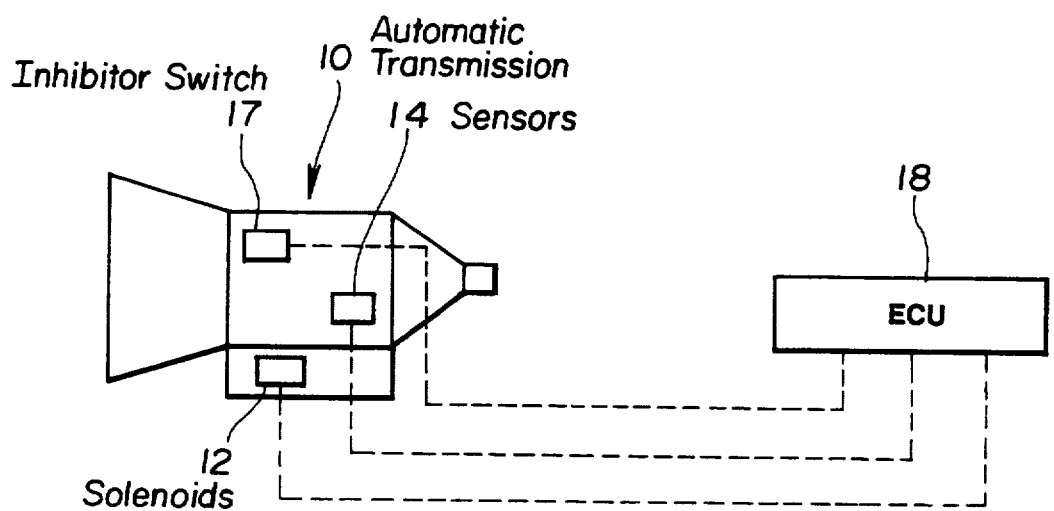
FIG. 5 is a circuit block diagram of an electronic control apparatus for an automotive automatic power transmission in a third preferred embodiment.

FIG. 5 shows a third preferred embodiment of the electronic control apparatus for the automotive automatic power transmission.

The structure of the third preferred embodiment shown in FIG. 5 is substantially the same as that of the first preferred embodiment shown in FIG. 1.

Furthermore, numeral 17 denotes a speed gear-range select position switch (inhibitor Switch) installed in the A/T 10 together with a characteristic storage unit 16 (refer to FIG. 6) which is placed in a side end of a casing of the main frame of the A/T 10.

Then, the electronic control device (unit) 18 is connected to the select position switch 17 in addition to the solenoids 12 and sensors 14.

Figure 6:
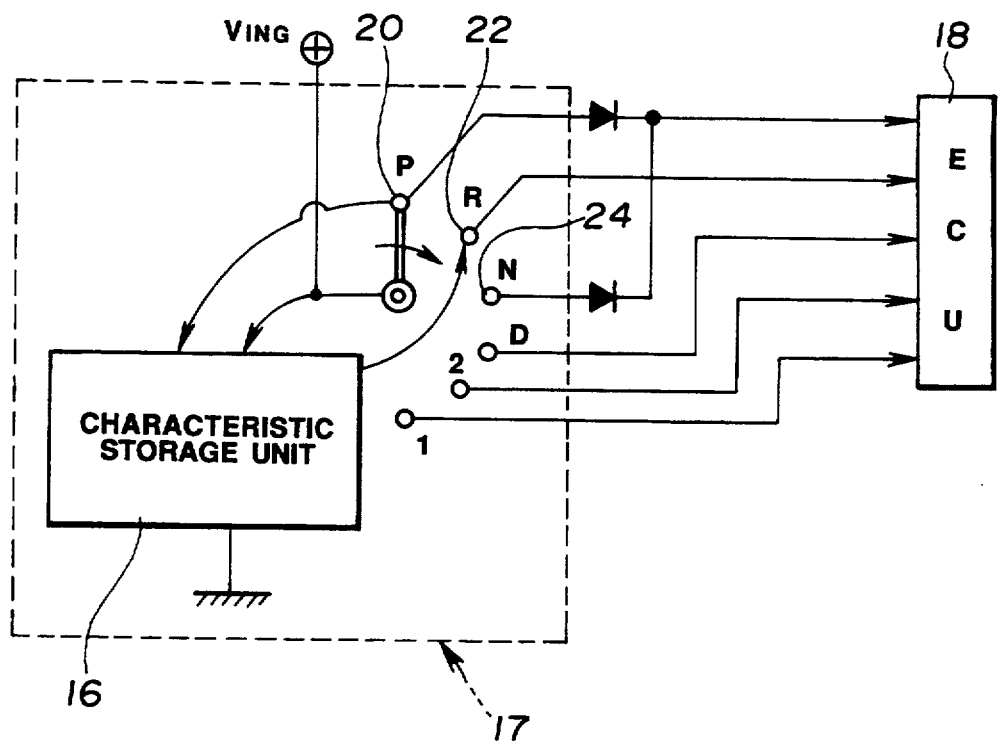
FIG. 6 is a circuit block diagram of an electronic control apparatus for an automotive automatic power transmission in the third preferred embodiment shown in FIG. 5, especially, a circuit wiring diagram of a select position switch and its peripheral circuit.

FIG. 6 specifically shows a structure of the select position switch 17 shown in FIG. 5.

Signals derived from a P (Parking) position 20 of the select position switch 17 and ignition key switch are input to the characteristic storage unit 16.

An output signal from the characteristic storage unit 16 is supplied to an R (Reverse) position 22 of the switch 17.

The characteristic storage unit 16 is set to output an inherent characteristic storage value to the electronic control unit 18 using the signal line connected to the R position 22 when the select position switch 17 is placed at either the P position 20 or N (Neutral) position 24. It is noted that the N position 24 is connected to the ECU via the same signal line as that connected to the P position 20.

Figure 7:
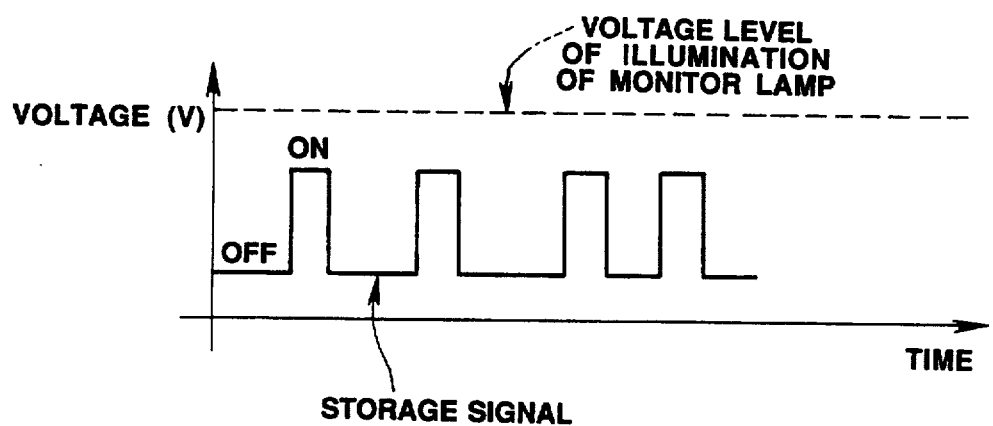
FIG. 7 is a schematic timing chart of an output signal of a characteristic storage unit in the case of the third preferred embodiment shown in FIG. 6.

Since the same signal lines as the output of each monitor (indicator) lamp (not shown, but generally connected to a corresponding signal line to the ECU 18) and to the electronic control unit 18 are used, the inherent characteristic storage signal of the characteristic storage unit 16 has a voltage level or frequency output characteristic lower than the voltage level (or frequency output characteristic) of the monitor lamp illumination (turning on) denoted by a dot line of FIG. 7.

The electronic control unit 18 carries out a correction of a basic control in accordance with an input inherent characteristic storage value so as to improve a reduction of a gear-range shift shock.

In the third preferred embodiment, although the storage signal of the characteristic storage unit 16 is output to the R position 22 and is transmitted to the ECU 18 using the signal line connected to the R position, any one (P, N, D, 2, 1) of the signal lines other than to the R position may alternatively be used to transmit the storage signal.

(Fourth Preferred Embodiment)

Figure 8:
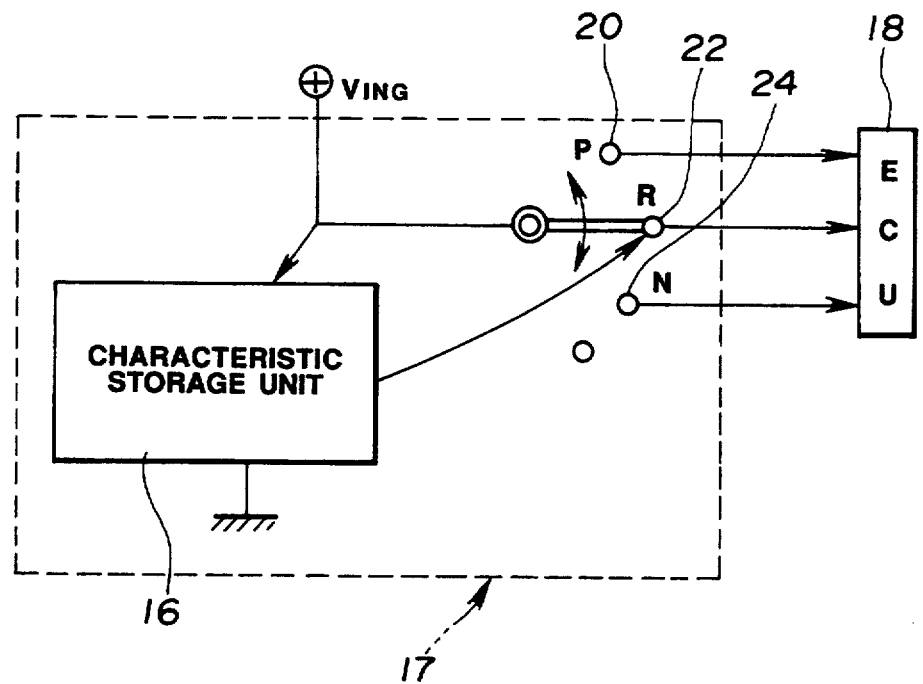
FIG. 8 is a circuit block diagram of an electronic control apparatus for an automotive automatic power transmission in a case of a fifth preferred embodiment.

FIG. 8 shows a fourth preferred embodiment of the electronic control apparatus for the automotive automatic power transmission.

Figure 9:
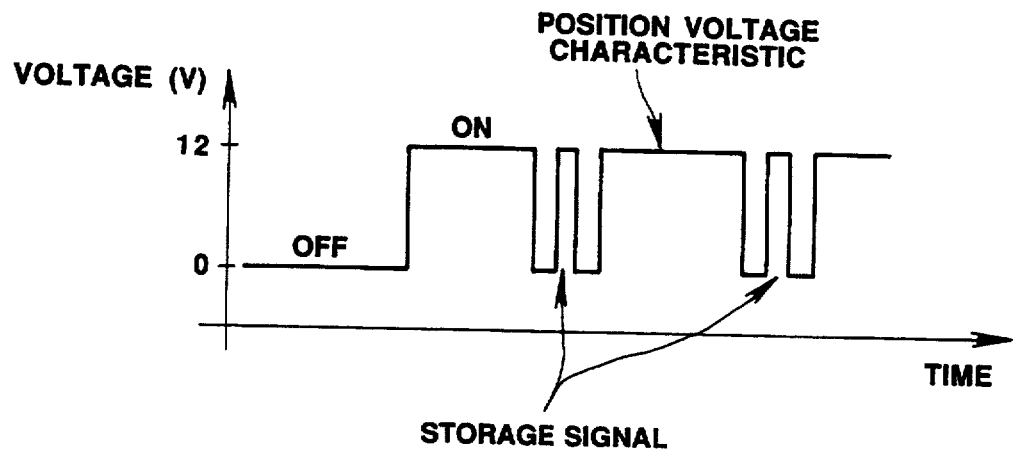
FIG. 9 is a schematic timing chart of an output signal in the case of the fourth preferred embodiment shown in FIG. 8.

The characteristic storage signal derived from the characteristic storage unit 16 is output to the R position 22. When the select position switch 17 is placed at the R position 22, tile characteristic storage unit 16 is set to output the storage signal to tile electronic control unit 18 via the signal line of the R position 22. In this case, the storage signal of the characteristic storage unit 16 is transmitted superposing the signal of the R position 22. Therefore, as shown in FIG. 9, the P position signal having the output frequency characteristic which does not illuminate the monitor lamp is output as shown in FIG. 9.

(Fifth Preferred Embodiment)

Figure 10:
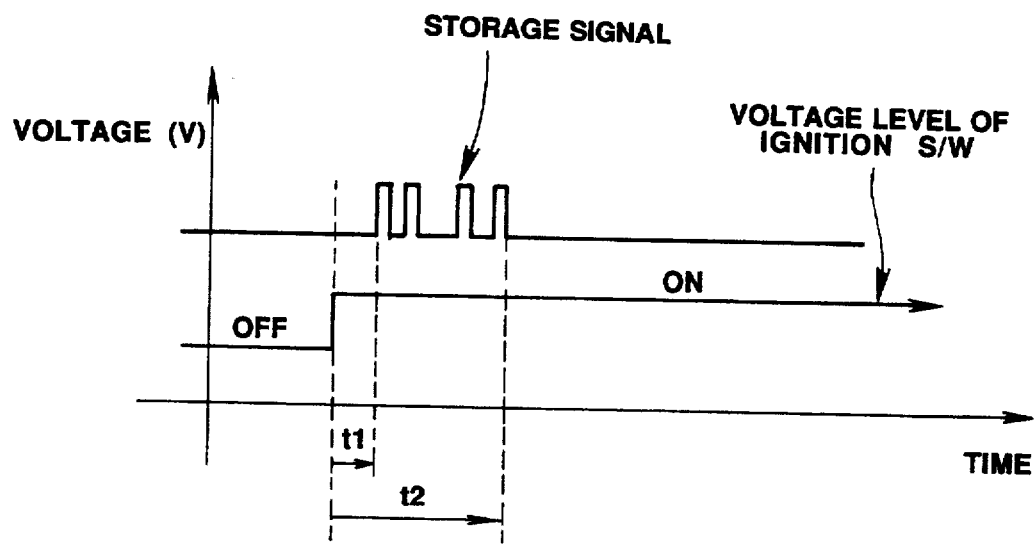
FIG. 10 is a schematic timing chart of an electronic control apparatus for an automotive automatic power transmission in a case of a fifth preferred embodiment.

FIG. 10 shows a fifth preferred embodiment of an electronic control apparatus according to the present invention.

Although the structure of the fifth preferred embodiment is the same as that in the fourth preferred embodiment shown in FIG. 8, for a constant period of time immediately after the ignition key switch is turned on, i.e., the inherent characteristic storage value stored in the characteristic storage unit 16 is set to be output to the electronic control apparatus 18 via the position signal line of the select position switch 17 only for a time duration from $t_1$ to $t_2$ shown in FIG. 10.

In this case, the storage signal to the characteristic storage unit 16 is output for a short constant period of time immediately after the ignition key switch is turned on. Therefore, it is not necessary to consider the frequency characteristic according to which the monitor lamp is not illuminated with the case of the fourth preferred embodiment taken into consideration. The storage signal is transmitted with the voltage level higher than that of the signal derived from the ignition switch shown in FIG. 10.

It is noted that the position signal line used in the fifth preferred embodiment is not limited to the particular but may be used for an arbitrary position signal line.

(Sixth Preferred Embodiment)

Figure 11:
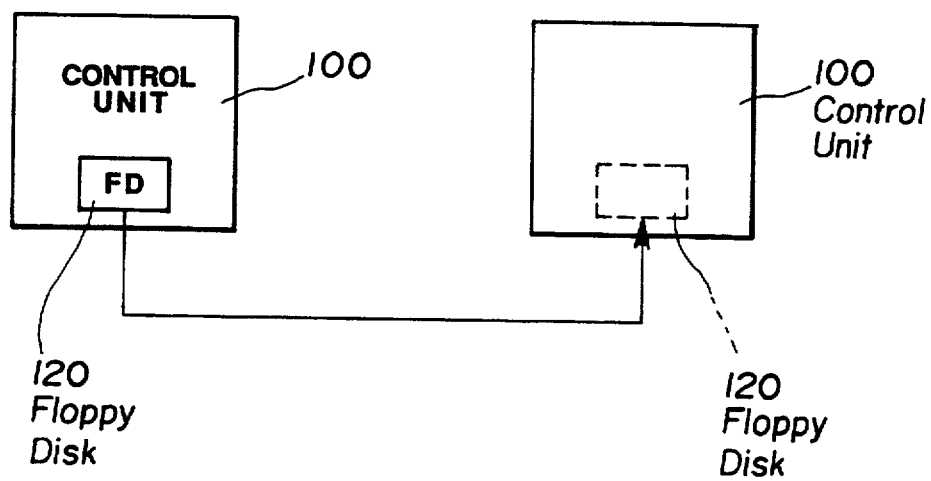
FIG. 11 is a schematic circuit block diagram of an electronic control apparatus for an automotive automatic power transmission in a sixth preferred embodiment.

FIG. 11 shows a sixth preferred embodiment of the electronic control apparatus for the automotive automatic power transmission.

A floppy disc 120 is mounted into the control unit (ECU) 100 as memory means. The information derived from the ECU 100 is stored and maintained (saved) into the floppy disc 120. When the unit exchange of the control unit 100 is carried out, the floppy disc 120 is picked up and the floppy disc 120 is mounted into the new control unit 100.

Thereby, the data stored in the floppy disc 120 can continuously be used.

(Seventh Preferred Embodiment)

Figure 12:
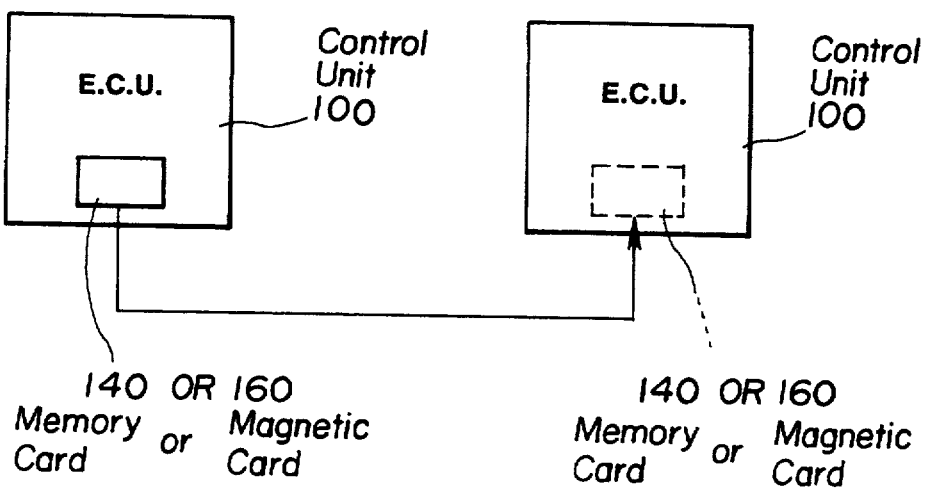
FIG. 12 is a schematic circuit block diagram of an electronic control apparatus for an automotive automatic power transmission in a seventh preferred embodiment.

FIG. 12 shows a seventh preferred embodiment of the electronic control apparatus for the automotive automatic power transmission.

As shown in FIG. 12, a memory card 140 or magnetic card 160 is mounted into the control unit (ECU) 100.

The data input from the control unit (ECU) 100 is saved into the memory card 140 or magnetic card 160. When the control unit 10 is replaced with new one, either the memory card 140 or magnetic card 160 is taken out of the old control unit 100 and is mounted into the new control unit (ECU) 100.

Consequently, the data saved into either the memory card 140 or magnetic card 160 can continuously be used.

(Eighth Preferred Embodiment)

Figure 13:
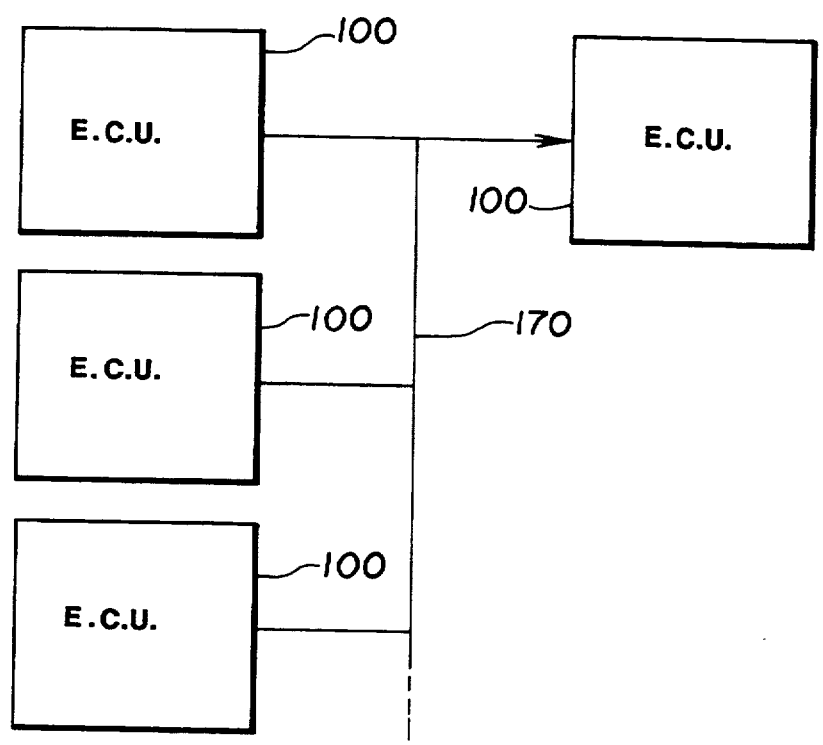
FIG. 13 is a schematic circuit block diagram of an electronic control apparatus for an automotive automatic power transmission in an eighth preferred embodiment

FIG. 13 shows an eighth preferred embodiment of the electronic control apparatus for the automotive automatic power transmission.

A communication circuit 170 is linked between the plurality of ECUs 100. During the replacement of the control unit 100, the old control unit (ECU) 100 and new control unit 100 is connected with the communication link 170 and the information stored in the old control unit 100 is transferred into the new control unit 100 via the communication circuit 170.

(Ninth Preferred Embodiment)

Figure 14:
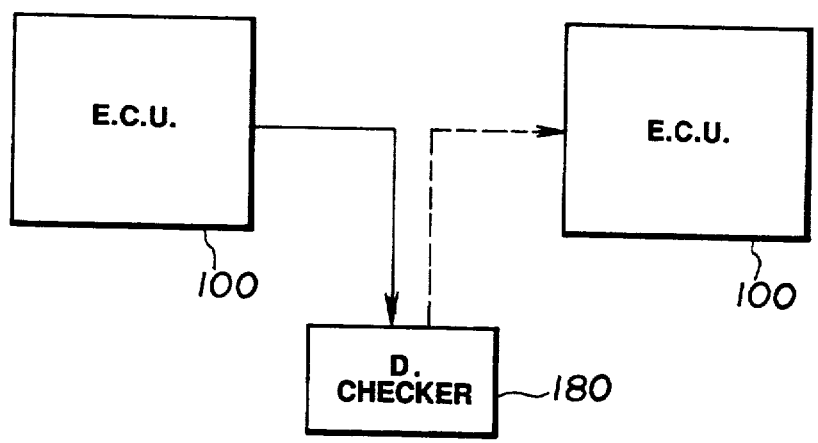
FIG. 14 is a schematic circuit block diagram of an electronic control apparatus for an automotive automatic power transmission in a ninth preferred embodiment.

FIG. 14 shows a ninth preferred embodiment of an electronic control apparatus for an automotive automatic power transmission.

As shown in FIG. 14, the control unit 100 is communicably linked (connected) with a diagnostic checker 180 (information collecting unit). During the replacement of the control unit 100, the storage information in the old control unit 100 is transferred to the diagnostic checker 180 using the communication line. Next, the communication line is linked via the new control unit (ECU) 100 and diagnostic checker 180. However, if it is the information collecting unit externally connected, it is not limited to the diagnostic checker 180.

(Tenth Preferred Embodiment)

Figure 15:
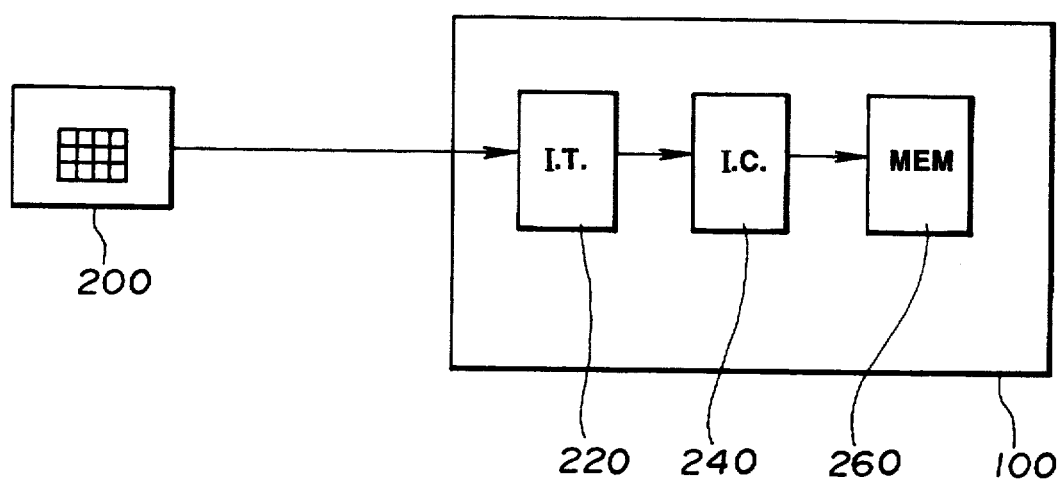
FIG. 15 is a schematic circuit block diagram of an electronic control apparatus for an automotive automatic power transmission in a tenth preferred embodiment.

FIG. 15 shows a tenth preferred embodiment of an electronic control apparatus according to the present invention.

The new control unit (ECU) 100 after replacement is connected to an information input unit 200 having a keyboard, the information being input therefrom.

The control unit (ECU) 100 includes: an information transfer device 220 from which the information from the information input device 200 is input; an information exchange device 240 which replaces the stored information with the information of the information transfer device 220 when it is different from the stored information; and a main frame of the memory 260 in which the information is stored. The information transfer device 220 is connected to the information exchange unit 240, the input information from the information input device 200 being transmitted to the information exchange device 240. The information exchange device 240 is connected to the main frame of the memory 260 to which the information in the information exchange device 240 is transmitted.

When the control unit 100 is replaced with the new control unit 100, the information such as total running distance and passed year, month, and day after registration is input to the new control unit 100 using the information input device 200. In the case of the new control unit 100, the information is input from the information input unit 200 to the information transfer unit 220 and the input information of the information transfer unit 220 is output to the information exchange unit 240. If this information is different from the information stored in the main frame of the memory 260, the information exchange device 240 exchanges it to an appropriate information which is output to the main frame of the memory 260. The main frame of the memory 260, then, saves the input information.

As described hereinabove, since the characteristic storage unit is installed on the main frame of the A/T according to the present invention, the content of control in the electronic control unit can be corrected on the basis of the inherent characteristic(s) stored in the characteristic storage unit and variations in the gearshift performance of the A/T can remarkably be reduced.

In addition, since the characteristic storage unit may be installed in an inner space of the casing of the selection position switch, it is not necessary to insert an expensive hermetically sealed casing to improve waterproof or dust-proof qualities. Thus, the cost of installing the characteristic storage unit can be reduced.

Furthermore, since the storage signal of the characteristic storage unit is input to the electronic control unit using the position signal line of the select position switch, it is not necessary to install additionally the signal line connecting between the characteristic storage unit and electronic control unit. Thus, a breakage or short-circuiting due to an increase of wire harness of the vehicle can be prevented and improvement in reliability can be achieved.

Furthermore, since the characteristic storage unit installed in the main frame of the A/T and electronic control unit located remote from the main frame of the A/T are electrically interconnected, the characteristic storage unit writes the characteristic inherent to the A/T, and the electronic control unit may read the information stored in the characteristic storage unit, the new electronic control unit after replacement can correct the content of control by reading the saved information in the characteristic storage unit even if the electronic control unit is replaced with the new one. Therefore, a behavior change of the A/T after and before the replacement does not occur. Since the content of the characteristic storage unit is arbitrarily rewritable when the characteristic information output from the electronic control unit is modified, deviations due to the aging effect may not occur.

Other various effects can be achieved according to the present invention.

It will fully be appreciated by those skilled in the art that the foregoing description is of the preferred embodiment and various changes and modifications may be made without departing from the scope of the present invention which is to be defined by tile appended claims.

What is claimed is:

1. An apparatus for electronically controlling an automatic power transmission of an automotive vehicle, comprising:

a) an electronic control unit for the automatic power transmission, said control unit being mounted in a predetermined position of the vehicle which is remote from a main frame of the automatic power transmission; and b) a characteristic storage unit installed on the main frame of the automatic power transmission, said characteristic storage unit including storing means for storing inherent characteristics of controllable devices and frictional components of the automatic power transmission, which are varied according to a model of the automatic power transmission and installed in the main frame of the automatic power transmission, said characteristic storage unit being electrically connected to said control unit.

2. An apparatus for electronically controlling an automatic power transmission of an automotive vehicle, as set forth in claim 1, wherein said storing means is a memory which is capable of writing and reading information thereof into said control unit.

3. An apparatus for electronically controlling an automatic power transmission of an automotive vehicle, as set forth in claim 2, wherein said memory comprises an EEPROM.

4. An apparatus for electronically controlling an automatic power transmission of an automotive vehicle, as set forth in claim 1, wherein said control unit reads a signal of each inherent characteristic of the controllable devices and frictional components and corrects values of the inherent characteristics, in the control unit, according to the read signal.

5. An apparatus for electronically controlling an automatic power transmission of an automotive vehicle, as set forth in claim 4, wherein said storing means of the characteristic storage unit includes a mechanical switch and wherein said storing means stores inherent characteristics of a plurality of solenoids for hydraulic controls and for gear shift controls and a plurality of sensors therefor.

6. An apparatus for electronically controlling an automatic power transmission of an automotive vehicle, as set forth in claim 5, wherein said mechanical switch is set to a position of "Large" when a stored characteristic of an output hydraulic value of one of the solenoids used for the hydraulic control with respect to a duty ratio output indicates a value approximate to an upper limit value, to a position of "Medium" when the stored characteristic indicates a value approximate to a reference value, or to a position of "Low" when the stored characteristic indicates a value approximate to a lower limit value and wherein said control unit corrects the duty ratio output to the solenoid when the mechanical switch is set to either the position of "Large" or "Low".

7. An apparatus for electronically controlling an automatic power transmission of an automotive vehicle, as set forth in claim 6, wherein when said mechanical switch is set to the position of "Large", the control unit corrects a content of the control unit such that the duty ratio output is reduced so that the output hydraulic value approaches the reference value and when said mechanical switch is set to the position of "Low", the control unit corrects the content of control such that the duty ratio output is increased so that the output hydraulic value approaches the reference value.

8. An apparatus for electronically controlling an automatic power transmission of an automotive vehicle, as set forth in claim 1, further comprising a gear range select position switch installed in the main frame of the automatic power transmission wherein said characteristic storage unit is installed in an internal space of a casing of the gear range select position switch.; and a signal line for electrically connecting said gear range select position switch to said control unit.

9. An apparatus for electronically controlling an automatic power transmission of an automotive vehicle, as set forth in claim 8, wherein said characteristic storage unit is electrically connected to said control unit via the signal line of the gear range select position switch.

10. An apparatus for electronically controlling an automatic power transmission of an automotive vehicle, as set forth in claim 9, wherein said characteristic storage unit is connected to an R position of the select position switch which is connected to said control unit via a signal line of the R position so that each stored value of the inherent characteristics of the controllable devices and frictional components is output to said control unit via the signal line of the R position when the select position switch is placed at either a P position or an N position.

11. An apparatus for electronically controlling an automatic power transmission of an automotive vehicle, as set forth in claim 10, wherein said characteristic storage unit outputs a signal indicating each stored value of the inherent characteristics of the controllable devices and frictional components to said control unit via the signal line associated with the R position of the select position switch, said signal having a voltage level which is lower than that supplied to a monitor lamp .

12. An apparatus for electronically controlling an automatic power transmission of an automotive vehicle, as set forth in claim 11, wherein a voltage signal derived from an ignition key switch of the automotive vehicle is supplied to said characteristic storage unit for biasing therefor and wherein said characteristic storage unit outputs a signal indicating each stored value of the inherent characteristics of the controllable devices and frictional components to said control unit for a predetermined period of time immediately after the ignition key switch is turned on.

13. An apparatus for electronically controlling an automatic power transmission of an automotive vehicle, comprising:
    a) an electronic control unit for the automatic power transmission, said control unit being mounted in a predetermined position of the vehicle which is remote from a main frame of the automatic power transmission; and
    b) a characteristic storage unit installed on the main frame of the automatic power transmission, said characteristic storage unit including storing means for storing inherent characteristics of controllable devices and frictional components of the automatic power transmission, which are varied according to a model of the automatic power transmission and installed in the main frame of the automatic power transmission, said characteristic storage unit being electrically connected to said control unit;
    wherein said control unit reads a signal of each inherent characteristic of the controllable devices and frictional components and corrects values of the inherent characteristics, in the control unit, according to the read signal; and
    wherein said storing means of the characteristic storage unit includes a mechanical switch and stores inherent characteristics of a plurality of solenoids for hydraulic controls and for gear shift controls and a plurality of sensors therefor.

* * * * *